May 15, 1951     I. A. WOERNER     2,552,879
FISH POLE CARRIER
Filed Feb. 27, 1948
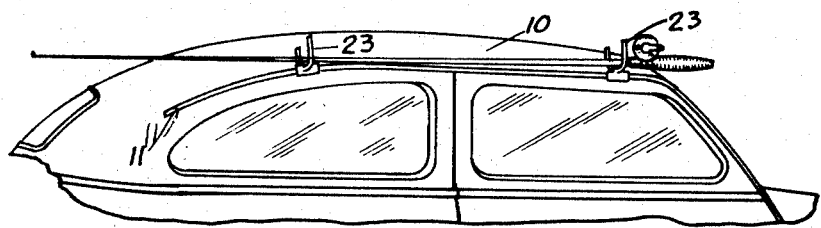
Fig.1.
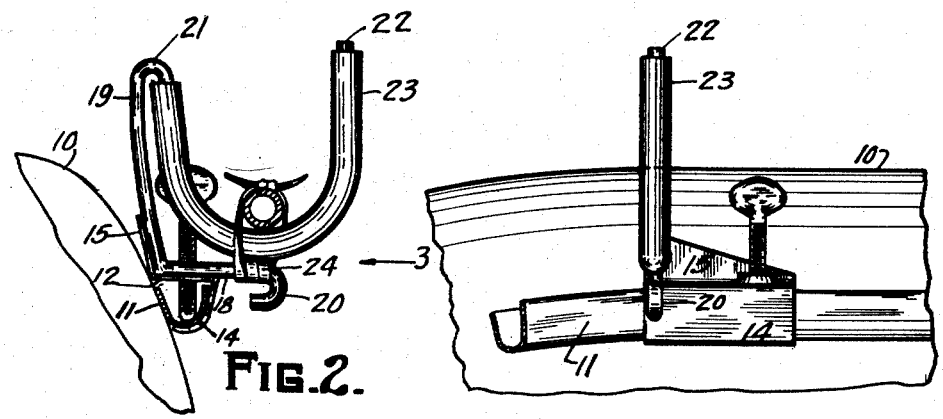
Fig.2.     Fig.3.
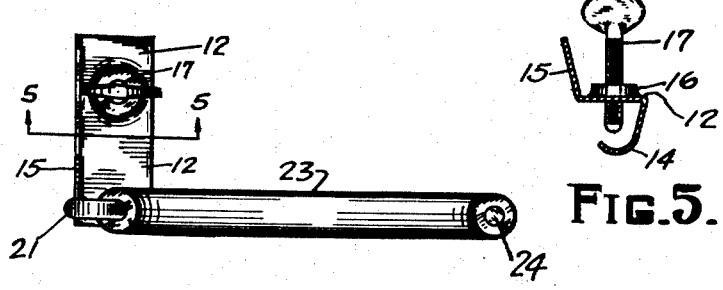 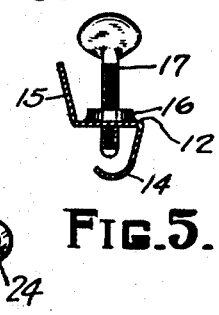
Fig.4.     Fig.5.
INVENTOR.
IRVIN A. WOERNER
BY
Martin E. Anderson
ATTORNEY Patented May 15, 1951

2,552,879

UNITED STATES PATENT OFFICE 2,552,879

FISH POLE CARRIER

Irvin A. Woerner, Fort Collins, Colo., assignor to R. L. Barmore, Wichita, Kans.

Application February 27, 1948, Serial No. 11,671

8 Claims. (Cl. 224—42.45)

1

This invention relates to improvements in fish pole carriers and the like.

Automobiles of the closed type, now almost universally used, are so constructed that it is difficult to carry elongated articles, such as fish poles that are too long to be placed inside of the automobile body.

Many motorists are fishermen and frequently make long trips to fishing localities. Unless they are provided with fish poles that can be separated into short sections, they find considerable difficulty in carrying such fish poles as they must be tied to the outside of the automobile body and when carried in this manner they nearly always rest on the fenders and thus prevent the doors on that side from being opened.

It is the object of this invention to produce a simple and substantial carrier for use with automobiles of the type provided with gutters along the sides and above the door openings.

Another object of this invention is to produce carriers for the purpose indicated that shall be of simple and substantial construction and so designed that they can be quickly applied to and removed from the car.

Another object of the invention is to produce carriers of the type indicated that can be spaced different distances so as to adapt them for carrying long articles, such as fish poles or shorter articles, such as golf clubs or the like.

A still further object of the invention is to produce a carrier of the type indicated that shall be so designed that the parts thereof can be made by means of suitable dies, thereby reducing the cost of manufacture.

The above and other objects that may become apparent as the description proceeds are attained by means of a construction and an arrangement of parts that will now be described in detail and for this purpose reference will be had to the accompanying drawing in which the invention has been illustrated in its preferred form, and in which:

Figure 1 is a side elevation of an automobile showing two carriers in position thereon and a fish pole in position in the carrier;

Figure 2 is an end view of the carrier that forms the subject of this invention showing the same in position on the gutter of an automobile, the latter being shown in section;

Figure 3 is a side elevation looking in the direction of arrow 3 in Figure 2;

Figure 4 is a top plan view of the carrier; and

Figure 5 is a section taken on line 5—5, Figure 4.

2

Referring now to the drawing, reference numeral 10 designates the top of an ordinary automobile body of the closed type and reference numeral 11 designates the door or rain gutter with which such cars are commonly provided. The gutter is of a U-shaped section as shown most clearly in Figure 2 and is generally secured to the body by welding. The carrier that forms the subject of this invention consists of a sheet metal clamping member having a flat portion 12 that is adapted to extend over the open top of the gutter, as shown in Figure 2. One edge of the clamping member is bent downwardly as indicated at 13 and terminates in an upwardly opening hook portion 14 that is adapted to receive and engage the under surface of the gutter, as shown most clearly in Figure 2. The other edge of the flat portion is bent upwardly at right angles as indicated at 15. The flat portion is provided with a threaded opening 16 with which is operatively connected a clamping screw 17. When the clamping member, that has just been described, is positioned on a gutter with the hook 14 in engagement with the under surface of the gutter, screw 17 is turned so as to force the hook portion 14 against the under surface of the gutter, thereby holding the clamping member rigidly in position. Secured to the clamping member that has just been described, is a load carrying hook that is preferably formed from a heavy wire and has a straight section 18 projecting at right angles from a straight vertical section 19. The two sections 18 and 19 are welded to parts 12 and 15. The part designated by reference numeral 18 extends some distance to the right, when viewed as in Figure 2, and terminates in a hook portion 20. The upper end of part 19 is reversely bent at 21 and is then formed into an upwardly opening hook for the reception of the load to be carried. The outer end of the hook has been designated by reference numeral 22. The load carrying hook is preferably covered with a rubber tubing 23 so as to prevent the hard metal from coming in contact with the polished surface of the fish poles and the like.

A shoe lace or a similar member 24 is secured to the outer end of part 18 and serves to tie the fish pole or other elongated member and hold the same in position.

From the above description, taken with the drawing, it will be evident that this carrier is of an extremely simple construction and that it has been so designed that it can be easily applied to and removed from the gutter of an automobile body. It can also be fastened in different longitudinally spaced positions so as to adapt it for carrying shorter articles than the fish pole shown in Figure 1.

Having described the invention what is claimed as new is:

1. A carrier for fish poles and the like, comprising a metal plate having a flat portion, one edge of which extends downwardly, terminating in an upwardly extending hook for engaging the convex under surface of an upwardly facing door gutter, said flat portion having a threaded hole, a clamping screw operatively positioned in the threaded hole for engaging the upper surface of said gutter forcing it into engagement with the concave surface of the hook, and an upwardly opening load carrying hook positioned above the flat portion of the plate and secured thereto adjacent the end opposite from the screw, the plane of the load carrying hook being perpendicular to the longitudinal axis of the flat portion.

2. A carrier of the class described, comprising an upwardly opening load carrying hook, and means for removably securing the same to the door gutter of an automobile top, said means comprising a sheet metal clamp having a substantially flat portion adapted to overlie the open top of the gutter, and an integral upwardly opening hook portion for engagement with the under surface of the gutter, the flat portion having a threaded hole near one end, a screw in the threaded hole for engaging the upper surface of the gutter bottom to force it against the hook of the clamp, the load carrying hook being rigidly connected with the upper surface of the flat portion near the end opposite from the screw.

3. A carrier for fish poles and the like, constructed and arranged for attachment to the door gutter of an automobile, comprising, in combination, a clamping member having a flat portion one edge of which extends at an angle of substantially ninety degrees, the other edge extending in the opposite direction and terminates in a curved portion whose concave surface faces the flat portion, the latter having a threaded opening near one end, a screw operatively mounted in the threaded opening for movement towards and away from the concave surface of said curved surface, and a load carrying hook supported by the upper surface of the clamping member, positioned adjacent the end opposite from the screw, said hook being attached to the upper surface of the flat portion and to the adjacent surface of the right angular edge of the member, the hook being positioned entirely above the upper surface of the flat portion and at right angles to the longitudinal axis of the clamping member.

4. A carrier adapted to be attached to an upwardly opening U-shaped automobile drain gutter having a convex lower surface, comprising; a clamping member having a laterally extending portion adapted to overlay the open channel of the U-shaped gutter directly thereabove and another portion adapted to extend around a side of the gutter, said last named portion terminating in an upwardly concave portion adapted to engage the lower convex surface of the gutter, means carried by said first named portion adapted to extend downwardly between the legs of the U-shaped gutter and engage the bight thereof substantially at its central portion to exert a force in a direction passing through the bight of the U-shaped gutter between the legs thereof, said means being movable in a direction substantially normal to the lowermost portion of said bight, and means on said carrier for supporting a load.

5. A carrier in accordance with claim 4 wherein said last named means comprises an upwardly extending open hook.

6. A carrier in accordance with claim 5 including flexible means secured to the carrier for tying an article thereto.

7. A carrier in accordance with claim 4 wherein said means carried by said first named portion comprises a screw threadedly engaging said portion adapted to overlay the open channel.

8. A carrier in accordance with claim 7 wherein said screw is disposed to one side, in a direction longitudinally of the gutter, of the means for supporting a load.

IRVIN A. WOERNER.

REFERENCES CITED

The following references are of record in the file of this patent:

UNITED STATES PATENTS

| Number | Name | Date |
| --- | --- | --- |
| 1,192,112 | Porter | July 25, 1916 |
| 1,708,497 | Clithero | Apr. 9, 1929 |
| 1,733,007 | Dahl | Oct. 22, 1929 |
| 1,798,872 | Ellis | Mar. 31, 1931 |
| 2,137,645 | Doench | Nov. 22, 1938 |
| 2,288,442 | Felton | June 30, 1942 |
| 2,436,228 | Purchase | Feb. 17, 1948 |
| 2,461,897 | Hopkins | Feb. 15, 1949 |